3,155,645
ISOTHIURONIUM SALTS OF BROMOHYDRIN ETHER DYESTUFFS
David Taber, Pittsburgh, and Edgar E. Renfrew and Henry W. Pons, Monroeville, Pa., assignors to American Aniline Products, Inc., a corporation of Maryland
No Drawing. Filed Dec. 18, 1961, Ser. No. 160,310
5 Claims. (Cl. 260—151)

This invention relates to new dyestuffs and to the coloring of cellulosic and other textile materials therewith. In one specific aspect, it relates to new water-soluble dyestuffs having attached thereto at least one isothiuronium salt of a bromohydrin ether.

In recent years there has been considerable interest in the manufacture of water-soluble dyestuffs containing triazine or pyrimidine rings to which there are attached reactive hologen atoms. These classes of dyestuffs are believed to react with the functional groups of cellulosic and other fibers and, as a result, give colorations which are extremely resistant to wet treatments. The dyestuffs must contain at least one ionogenic solubilizing group, e.g., sulfonic acid or carboxylic acid groups, to make them sufficiently water-soluble to be applied from an aqueous bath. The requirement for at least one sulfonic acid or carboxylic acid group thus imposes a limitation on the type of colored compound that can be used to synthesize the dyestuffs.

We have found that unexpectedly superior water-soluble dyestuffs can be made from water-insoluble dyestuffs, free of ionogenic solubilizing groups, by converting water-insoluble dyestuffs containing a bromohydrin ether group to isothiuronium salts. Our new dyestuffs, when applied to cellulose or other textiles by dyeing or printing in the presence of an acid-binding agent, give bright colorations which have good wash fastness.

It is therefore an object of the present invention to provide a new class of water-insoluble dyestuffs having attached thereto at least one isothiuronium salt of a bromohydrin ether group.

In accordance with the invention, we have discovered dyestuffs of the formula

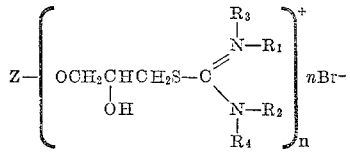

wherein Z is a water-insoluble colored moiety of the azo, anthraquinone, phthalocyanine or nitro series as recognized by the Colour Index, 2nd Edition, 1956; $n$ is a small, whole number having a value from 1–4; $R_1$ and $R_2$, as individual substituents, are members selected from the group consisting of hydrogen and lower alkyl and, taken collectively, they represent an alkylene bridge having from 2–3 carbon atoms, said bridge connecting the N atoms to which $R_1$ and $R_2$ are attached; and $R_3$ and $R_4$ are hydrogen or lower alkyl. The Z term, representing the dystuff moiety, is free of ionogenic solubilizing groups.

The new dyestuffs are made by the interaction of one mole of a water-insoluble hydroxyl-containing colorant of the azo, anthraquinone, phthalocyanine or nitro series with at least one mole of epibromohydrin per hydroxyl group to form a water-insoluble bromohydrin ether dyestuff. This intermediate is converted to the water-soluble isothiuronium salt by reacting it with a thiourea.

In lieu of the epichloro- or epibromohydrin used to prepare the 2-hydroxy-3-bromopropoxy intermediates, the hydroxy-containing colorants can be reacted with an allyl halide, e.g., allyl chloride or allyl bromide, to form an allyl amine which, by reaction with hypobromous acid, is converted to an intermediate useful in the invention.

The water-insoluble hydroxyl-containing colorants of the azo series suitable for making the dyestuffs of the invention are made by coupling, with any suitable coupling component, phenol, substituted phenols having an open o- or p-position, o-cresol, p-cresol, substituted cresols with an open o- or p-position, xylenol, resorcinol, pyrogallol, amino phenols, 1-naphthol and substituted 1-naphthols, 2-naphthol and substituted 2-naphthols, 2-methyl-3-quinolinol, 8-quinolinol, 2,4-quinolinediol and N,N-dialkylanilines in which at least one of the alkyl groups contains an hydroxyl function.

Specific useful hydroxyl-containing colorants include, but are not limited to, aniline→phenol; 1-naphthylamine→phenol; picramic acid→phenol; picramic acid→p-chlorophenol; picramic acid→p-hydroxyacetanilide; aniline→o-cresol; picramic acid→o-cresol; aniline→p-cresol; p-aminoacetanilide→p-cresol; o-toluidine→p-cresol; p-phenetidine→p-cresol; picramic acid→p-cresol; picramic acid→6-hydroxy-m-acetotoluidide; picramic acid→2,4-xylenol; anline→resorcinol; 2-amino-4-nitrophenyl→resorcinol; aniline→pyrogallol; p-nitroaniline→pyrogallol; N,N-dimethyl-p-phenylene-diamine→pyrogallol; p-aminophenyl→pyrogallol; aniline→1-naphthol; o-toluidine→1-naphthol; p-phenetidine→1-naphthol; picramic acid→5,6,7,8-tetrahydro-2-naphthol; aniline→2-naphthol; o-nitroaniline→2-naphthol; m-nitroaniline→2-naphthol; p-nitroaniline→2-naphthol; a copper complex derived from p-nitroaniline→2-naphthol; 2,4-dinitroaniline→2-naphthol; 5-chloro-2-nitroaniline→2-naphthol; 2-chloro-4-nitroaniline→2-naphthol; 4-chloro-2-nitroaniline→2-naphthol; o-toluidine→2-naphthol; 5-nitro-o-toluidine→2-naphthol; 2-nitro-p-toluidine→2-naphthol; 2-nitro-4-trifluoromethylaniline→2-naphthol; 2,4-xylidine→2-naphthol; o-anisidine→2-naphthol; 5-chloro-o-anisidine→2-naphthol; cresidine→2-naphthol; 4-nitro-o-anisidine→2-naphthol; 5-nitro-o-anisidine→2-naphthol; 1-naphthylamine→2-naphthol; 2-naphthylamine→2-naphthol; 2-amino-4,6-dichlorophenol→2-naphthol; 2-amino-5-nitrophenol→2-naphthol; picramic acid→2-naphthol; tolusafranine(CI50240)→2-naphthol; N,N-diethyltolusafranine→2-naphthol; o-chloroaniline→3-hydroxy-2-naphthanilide; m-chloroaniline→3-hydroxy-2-naphthanilide; 2,5-dichloroaniline→3-hydroxy-2-naphthanilide; 5-nitro-o-toluidine→3-hydroxy-2-naphthanilide; 3-amino-p-anisanilide→3-hydroxy-2-naphthanilide; 3-amino-p-tolu-2,4-xylidide→4′-chloro-3-hydroxy-2-napthanilide; 5-nitro-o-toluidine→4′-chloro-3-hydroxy-2-naphthanilide; 2-nitro-p-toluidine→3-hydroxy-3′-nitro-2-naphthanilide; 5-nitro-o-anisidine→3-hydroxy-3′-nitro-2-naphthanilide; 3-amino-p-anisanilide→3-hydroxy-3′-nitro-2-naphthanilide; 2,4,5-trichloroaniline→3-hydroxy-2-naphtho-o-toluidide; 4-chloro-2-nitroaniline→3-hydroxy-2-naphtho-o-toluidide; 4-nitro-o-toluidine→3-hydroxy-2-naphtho-o-toluidide; 5-nitro-o-toluidine→3-hydroxy-2-naphtho-o-toluidide; 2-nitro-p-toluidine→3-hydroxy-2-naphtho-o-toluidide; 4-nitro-o-anisidine→3-hydroxy-2-naphtho-o-toluidide; 2-nitro-p-anisidine→3-hydroxy-2-naphtho-o-toluidide; 4-chloro-o-toluidine→4′-chloro-3-hydroxy-2-naphtho-o-toluidide; 5-chloro-o-toluidine→5′-chloro-3-hydroxy-2-naphtho-o-toluidide; 2,5-dichloroaniline→3-hydroxy-2-naphtho-p-toluidide; m-amino-N-butylbenzamide → 3-hydroxy-2-naphtho-p-toluidide; 5 - phenylsulfonyl - o - anisidine → 3 - hydroxy - 2 - naphtho - 2,3-xylidide; 5-benzylsulfonyl-o-anisidine → 3 - hydroxy-2-naphtho-2,3-xylidide; 2,5-dichloroaniline→3-hydroxy-2-naphth-o-phenetidide; 2,4-dichloroaniline→3-hydroxy-2-naphth-o-anisidide; 4-chloro-2-nitroaniline→3-hydroxy-2-naphth-o-anisidide; $N^1,N^1$-diethyl-4-methoxymetanilamide → 5′-chloro-3-hydroxy-2,4′-dimethoxy-2-naphthanilide; 4-nitro-o-anisidine→3-hydroxy-N-(1-naphthly)-2-naphthamide; 2-nitro-p-anisidine→3 - hydroxy - N - (1- naphthyl)-2-naphthamide; aniline→2,4-quinolinediol; p-chloroaniline→2,4-quinolinediol; o-nitroaniline→2,4-quinolinediol; 4-chloro-o-toluidine → 2-hydroxy-2'-5'-dimethoxy - 3 - dibenzofurancarboxanilide; m-chloroaniline→4'-chloro-2-hydroxy-3-carbazolecarboxanilide; 2,4-dichloroaniline→ 4'-chloro-2-hydroxy-3-carbazolecarboxanilide; 2,4-dichloroaniline → 4'-chloro-2-hydroxy-3-carbazolecarboxanilide; o-toluidine→4'-chloro-2-hydroxy-3-carbazolecarboxanilide; 3-amino-p-anisanilidide → 4'-chloro-2-hydroxy-3-carbazolecarboxanilide; o-nitroaniline→acetoacetanilide; p-nitroaniline→acetoacetanilide; 4-chloro-2-nitroaniline→acetoacetanilide; 2-nitro-p-toluidine→acetoacetanilide; 2-nitro-p-anisidine→acetoacetanilide; 2-amino-4-nitrophenol→acetoacetanilide; 4-chloro-2-nitroaniline→o-chloroacetoacetanilide; 2-nitro-p-toluidine→o-acetoacetotoluidide; 2-nitro-p-anisidine→o-acetoacetotoluidide; 4-chloro-2-nitroaniline→2,4-acetoacetoxylidide; 2-nitro-p-toluidine→2,4-acetoacetoxylidide; 2-nitro-p-anisidine→o-acetoacetanisidide; 1-amino-3-bromoanthraquinone→2,5-dimethoxyacetoacetanilide-2,4,5-trichloroaniline → 4-chloro-2,5-dimethoxyacetoacetanilide and 4-chloro-o-toluidine →4-chloro-2,5-dimethoxyacetoacetanilide.

Other useful couplers which can be used, as indicated hereabove, to make intermediates for the compounds of the invention include, 1,5-dihydroxynaphthalene, 1,8-dihydroxynaphthalene, 1,6-dihydroxynaphthalene, 1,7-dihydroxynaphthalene and anthrols such as 1-anthrol and 2-anthrol.

Additional useful couplers include: 2,2'-(phenylimino)diethanol, 2-m-toluidinoethanol, 2,2'-(m-tolylimino)diethanol, 2-(N-methyl-m-toluidino)ethanol, 2-(N-methylanilino)ethanol, 2 - (N-ethylanilino)ethanol, 2,2'-(m-chlorophenylimino)diethanol, 2-(N-n-butyl-m-toluidino)ethanol, 2-(N-n-butylanilino)ethanol, 2-N-n-butyl-6-methoxy-m-toluidino)ethanol, 3-anilino-1 2-propanediol, 3-N-ethylanilino-1,2-propanediol, β-(N-2-hydroxyethyl - m - toluidino)propionitrile, β-(N-2-hydroxyethylanilino)propionitrile, and 1-sec-butyl-1,2,3,4,-tetrahydro-7-methyl-3-quinolinol.

Disazo dyestuffs useful as intermediates in the invention include p-aminoacetanilide (2 moles)⇒ m-phenylenediamine, then hydrolyze the acetamido groups, or p-nitroaniline (2 moles)⇒m-phenylenediamine, then reduce the nitro groups with sodium sulfide; aniline (2 moles) ⇒ o-cresole; 2,4-xylidine (2 moles)⇒ resorcinol; aniline (2 moles)⇒ fustic extract (Maclurin and Morin C175240 and 75660); 2,4-dichloroaniline (2 moles)⇒ 4,4'-bi-o-acetotoluidide; 5-chloro-o-toluidine (2 moles)⇒ 4,4'-bi-o-acetoacetotoluidide; 4-methoxy-m-phenylenediamine ⇒ m-phenylenediamine (2 moles); 2,4'-biphenyldiamine ⇒p-isohexylphenol (2 moles); benzidine ⇒resorcinol (2 moles); 3,3'-dichlorobenzidine⇒acetoacetanilide (2 moles); 3,3'dichlorobenzidine⇒o-acetoacetotoluidide (2 moles); o-tolidine⇒acetoacetanilide (2 moles); o-tolidine⇒o-acetoacetotoluidide (2 moles); o-tolidine⇒resorcinol (2 moles); o-dianisidine⇒acetoacetanilide (2 moles); o-dianisidine⇒2,4-acetoacetoxylidide (2 moles); o-dianisidine⇒3-hydroxy-2-naphthanilide (2 moles); 4,4' - cyclohexylidenedi-o-toluidine⇒p-cyclohexylphenol (2 moles); 4,4'-benzylidenedi-2,5-xylidene p-cresol (2 moles); 4,4'-(o-chlorobenzylidene)di-2,5-xylidine ⇒ 2-naphthol (2 moles); 4,4'-benzylidenedi-o-anisidine ⇒ 2-naphthol (2 moles); 4,4-diaminodiphenylamine⇒p-isohexylphenol (2 moles); 4,4' diaminothiocarbanilide ⇒ phenol (2 moles); p-phenylazoaniline→phenol; 4-o-tolylazo-o-toluidine→phenol; aniline→1 - naphthylamine →phenol; p-phenylazoaniline→o-cresol; p-phenylazoaniline→2-naphthol; 4-o-tolylazo-o-toluidine→2-naphthol; o-toluidine→2,5-xylidine→2-naphthol; xylylazoxylidine→2-naphthol.

Useful hydroxyl-containing anthraquinones include N-[2-(3-hydroxyanthraquinonyl)]-1-nitro-2-anthraquinonecarboxamide, 4-anilino-5-nitrochrysazin, 4-aniline-8-nitroanthrarufin, 1-hydroxy-4-(p-toluino) anthraquinone, 4-[m - (1-hydroxyethyl)anilino]-8-nitroanthrarufin, 1-hydroxyanthraquinone, 2-bromoquinizarin, 2,3-dihydroxyquinizarin, 2-chloroquinizarin, quinizarin, 2-nitroquinizarin, 4,8-dinitroanthrarufin, 1,4-bis(2-hydroxyethylamino)-5,8-dihydroxyanthraquinone, 1,2-dianilino-4-hydroxyanthraquinone, 4,8-diaminoanthrarufin, 1-amino-4-hydroxyanthraquinone, 1-amino-2-(2-hydroxyethylmercapto)-4-hydroxyanthraquinone, 1 - amino-2-bromo - 4 - hydroxyanthraquinone, 1-amino-2-phenoxy-4-hydroxyanthraquinone, 1-anilino-4-hydroxyanthraquinone, chrysazin, anthrarufin, 1-amino-2-methoxy-4-hydroxyanthraquinone, 1-amino-2-ethoxy-4-hydroxyanthraquinone, 1-amino-2-benxyloxy-4-hydroxyanthraquinone, 1-amino-2-(2-hydroxyethoxy)-4-hydroxyanthraquinone, 1-amino-2-(2-methoxyethoxy)-4-hydroxyanthraquinone, 1-amino-2-methylmercapto-4-hydroxyanthraquinone, 1-amino-2-ethylmercapto-4-hydroxyanthraquinone, 1-amino-2-ethylmercapto-4-hydroxyanthraquinone, 1-amino-2-(o-tolymercapto)-4-hydroxyanthraquinone, 1-amino-2-(p-chlorobenzylmercapto)-4-hydroxyanthraquinone, 1-amino-2,3-dichloro-4-hydroxyanthraquinone, 1,4,5,8-tetrahydroxyanthraquinone, 4,8-diamino-2,5-dimethoxyanthrarufin, 4,5-diamino-2,7-diphenoxychrysazin, 1-methylamino-4-hydroxyanthraquinone, 1-amino-2-methyl-4-hydroxyanthraquinone, 1-benzamido-4-hydroxyanthraquinone, 1-acetamido-4-hydroxyanthraquinone, 1-benzamido-5-hydroxyanthraquinone, 1-propionamido-5-hydroxyanthraquinone, 4,8-dianilinoanthrarufin, 4,5-di-p-toluidinochrysazin, 1-hydroxy-4-cyclohexylaminoanthraquinone, 1-(p-hydroxyanilino)anthraquinone, 1-hydroxy-4-(p-hydroxyanilino)anthraquinone, 1-amino-4-(p-hydroxyanilino)anthraquinone, 1-methylamino-4-(p-hydroxyanilino)anthraquinone, 1-(p-chlorobenzamido)-4-(p-hydroxyanilino)anthraquinone.

Colorants of the phthalocyanine series useful in making the dyestuffs of the invention are those free of ionogenic solubilizing groups which contain at least one hydroxyl group. The hydroxyl group may be attached directly to the benz-rings of the phthalocyanine nucleus or it may be attached through a divalent bridging radical. The useful phthalocyanines are made by conventional methods, e.g., by heating together a mixture of the appropriate phthalic acid derivative, urea, and cupric chloride in o-dichlorobenzene at about 150° C. For example, the tetra(-p-hydroxyphenoxy)phthalocyanine is made by preparing the phthalocyanine by the foregoing method from the nitrophenoxy-phthalic acid, reducing the nitro group to an amino group and thereafter converting the amino group to a hydroxyl group. Alternatively, mono-, di-, tri- or tetrahydroxy-substituted phthalocyanines can be made from the corresponding mono-, di-, tri- or tetra(chlorosulfonated)pththalocyanine by reacting it with an aminophenol.

Useful colorants of the nitro series include picric acid, 2,4-dinitrophenol and the hydroxy-substituted derivatives of diphenylamines and phenylnaphthylamines, such as 2,4-dinitro-4'-hydroxydiphenylamine, 5-(2,4-dinitrophenyl)amino-2-naphthol and the like. These derivatives are conveniently made by condensing an arylamine containing a hydrolyzable group, such as acylamido, with an aryl halide containing nitro groups in the o- or p-positions, e.g., 2,4-dinitrochlorobenzene, then hydrolyzing the product to the free arylamine. The arylamine is then diazotized and the diazonium salt decomposed in hot acidic aqueous solution to provide the hydroxyl compound.

Thioureas from which the isothiuronium salts of the invention can be made include thiourea, ethylenethiourea, N,N-dimethylthiourea, N,N,N'-trimethylthiourea, and N,N',N'-tetramethylthiourea.

In preparing the dyestuffs of the invention the desired hydroxyl-containing colorant of the azo, anthraquinone, phthalocyanine or nitro series is reacted with at least one mole of epibromohydrin per hydroxyl group, as shown hereunder, to form the halohydrin ether.

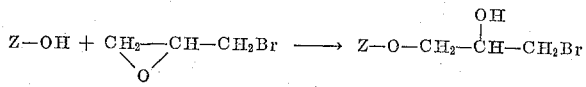

Conveniently, the reaction is accomplished by reacting an excess of epibromohydrin with the hydroxylated material at about 100° C. in the presence of a catalytic amount of base, such as piperidine. After distilling off excess epibromohydrin, the residue is dissolved in a suitable inert solvent, e.g., chlorofrom, shaken with aqueous hydrobromic acid to convert any glycidyl ether to the bromohydrin, and the product isolated by distilling off the solvent after separating from the aqueous layer and washing until neutral. Alternatively, there may be used an inorganic alkali, e.g., sodium hydroxide. The remainder of the preparation is similar to the procedure just detailed.

During the preparation of the halohydrin ether, it is desirable that the colorants containing free amino groups be used in the form of their acylamido derivatives in order to protect the amino group from reaction with the halohydrin and thus minimize undesirable side reactions.

Isothiuronium salts are formed from the bromohydrin ether according to the following equation:

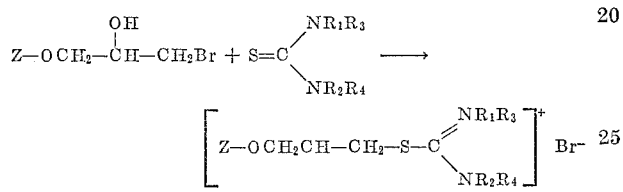

Z, $R_1$, $R_2$, $R_3$ and $R_4$ have the values given aforesaid. The reaction is conducted at a temperature between 60 and 125° C. either in aqueous slurry or in a solution using a suitable solvent, such as dioxane or a lower alkanol. The product is recovered from the aqueous reaction mixture by drowning the mixture in a large excess of acetone or by salting out the product with an inorganic salt, such as sodium chloride. If a solvent is used, the dyestuff precipitates from the reaction mixture and is recovered by filtration. The dyestuff thus obtained is oven dried and is thereafter ready for use.

The new dyestuffs of the invention are especially suited for the coloration of cellulosic textile materials such as cotton, linen, and viscose rayon, although they also may be effectively applied to silk, wool, nylon and the like.

The dyestuffs are applied by treating the textile material in an aqueous solution (which may be a thickened printing paste) of the dyestuff in the presence of an acid-binding agent, for example, sodium hydroxide, sodium phosphate, or sodium carbonate. The acid-binding agent may be added to the dye bath either prior to, simultaneously with, or after the addition of the dyestuff.

The dyestuff solution may contain commonly used dye bath adjuvants such as sodium chloride, sodium sulfate, sodium alginate, urea or water-soluble alkyl ethers of cellulose.

The printing paste may contain commonly used adjuvants, such as urea, and thickening agents, e.g., methyl cellulose, starch, locust bean gum, and sodium alginate.

Dyeing in the presence of the acid-binding agent is preferably carried out at elevated temperatures, for example, at temperatures between 60° C. and the boiling point of the dyestuff solution in order to improve the exhaustion and fixation of the dyestuff.

The textile material printed with printing paste containing an acid-binding agent is preferably steamed or heated in order to fix the dyestuff on the textile material.

When the acid-binding agent is applied to the textile material before or after the dyestuff, it is preferably applied by treating the fiber with an aqueous solution of the acid-binding agent, i.e., a padding technique. The aqueous solution of acid-binding agents may also contain the common dye bath adjuvants.

Both the solution of acid-binding agent and dyestuff may be applied at room temperature or at elevated temperatures. The textile material can be dried between the two treatments if desired. It is preferred to heat or steam cellulosic material at an elevated temperature, for example, at 100° C. or higher, for a short period of time after application of the dyestuff and acid-binding agent to fix the dyestuff on the textile material.

The above techniques may be modified by substituting for the acid-binding agent a substance which on heating or steaming generates an acid-binding agent. Such substances include alkali metal bicarbonates which on steaming yield alkali metal carbonates.

The fastness to washing or subsequent wet processing of the colorations produced using our new dyestuffs is improved by a scouring treatment, e.g., applying a hot aqueous solution of soap and sodium carbonate followed by rinsing in hot water prior to drying.

The new dyestuffs may also be applied to silk, wool, regenerated protein, nylon and modified polyacrylonitrile textile materials by using the conventional dyeing methods for those textile materials, i.e., dyeing from weakly acid dyebath solutions, for example, dyestuff solutions containing acetic acid or ammonium sulfate at a temperature above 80° C. When dyeting proteinaceous fibers in conjunction with an acidic catalyst, it is preferable to use a temperature between 80° C. and 100° C.

Our invention is further illustrated by the following examples:

Example I 2-methoxy-5-nitroaniline is diazotized and coupled into β-naphthol. A mixture of 9.7 g. (0.030 mole) of the coupling product and 12.3 g. (0.090 mole) of epibromohydrin is stirred and held at 97–105° C. for six hours in the presence of a trace of piperidine. After distilling the excess epibromohydrin under vacuum, the residue is dissolved in chloroform and shaken with 48% hydrobromic acid. This treatment converts any epoxide which may have formed into the desired bromohydrin. After washing neutral with water, the solvent is distilled under vacuum and the residue is dried at 50° C. under vacuum.

The isothiuronium salt of the bromohydrin so formed is prepared as follows: A mixture of 9.2 g. of the bromohydrin, 7.6 g. of thiourea and 6 ml. of water is stirred at 95° C. until a sample is soluble in water. The mixture is cooled, then added to 250 ml. of acetone. The precipitated product is triturated with acetone and washed well with fresh portions of that solvent, then dried at 50° C. under vacuum. There is obtained 6.7 g. (63% yield, based on the coupling product) of yellow-orange-colored dye.

Example II

A 1% solution of the dye of Example I is prepared in water and used to pad 80 x 80 print cloth. After an intermediate dying, a portion of the padded cloth is padded a second time with a solution of 5 g. of sodium hydroxide and 200 g. of sodium chloride per liter, then steamed for 60 seconds. A second portion of the cloth padded with dye is also padded with the sodium hydroxide-sodium chloride solution and held for three minutes in an oven at 150° C. After rinsing, each of the dyed samples exhibits very good wash fastness when tested with hot alkaline soap solution.

Example III 4-chloro-o-toluidine is diazotized and coupled into 4'-chloro-3-hydroxy-2-naphthol-o-toluidide. By condensing this product with epibromohydrin according to the procedure in Example I, the corresponding 3-bromo-2-hydroxypropoxy compound is obtained.

A mixture of 6.0 g. (0.010 mole) of the bromohydrin prepared above, 5.1 g. (0.050 mole) of 2-imidazolidinethione, and 5 ml. of water is stirred and heated at 95° C. until a sample is soluble in water. After cooling and adding the reaction mixture to an excess of acetone, the product is triturated with fresh portions of acetone, filtered off, washed with acetone and dried at 50° C. under vacuum. There is obtained 6.2 g. (89%) of scarlet-colored dye.

Example IV

The procedure of Example II is followed using a 1% solution of the dye of Example III. The fastness of the dyeing to soaping is once again much greater than that of the colorant from which the new dyestuff is prepared.

Example V

The procedure of Example III is repeated using 1-(2-methoxy - 4 - nitrophenylazo) - 2 - (3-bromo-2-hydroxypropoxy)-3-naphthianilide as a starting material. There is obtained in good yield a bluish-red dye.

Example VI

The procedure of Example III is repeated using 3-bromo-1 - [4-N,N-bis(3-bromo-2-hydroxypropoxyethyl)-anilinoazo]anthraquinone as a starting material. There is obtained in good yield a purple dye.

Example VII

The procedure of Example III is repeated using 4,4'-bis[2-(3-bromo-2-hydroxypropoxy) - 1-naphthylazo]-3,3'-dichlorobiphenyl as a starting material. There is obtained in good yield a reddish-violet dye.

Example VIII

The procedure of Example III is repeated using 2-(3-bromo-3-hydroxypropoxy)-1-(2,5 - dichlorophenylazo)-3-naphtho-p-toluidide as a starting material. There is obtained in good yield a bluish-red dye.

Example IX

The procedure of Example III is repeated using 8-(4-nitrophenylazo) - 5 - (3-bromo - 2 - hydroxypropoxy)-1-naphthol as a starting material. There is obtained in good yield a scarlet dye.

Example X 4,8-dianilinoanthrarufin is condensed with epibromohydrin according to the procedure in Example I to form the corresponding bis(bromohydrin ether).

A mixture of 20.9 g. (0.030 mole) of the bis-bromohydrin, 15.8 g. (0.12 mole) of N,N,N',N'-tetramethylthiourea, and 12 ml. of water is stirred and heated at 95° C. until a sample is water-soluble. After adding the reaction mixture to an excess of acetone, triturating the precipitated product with fresh portions of acetone, filtering off the solid, and drying it at 50° C. under vacuum, there is obtained 24.7 g. (96%) of blue-colored dye.

Example XI

The procedure of Example II is followed using a 1% solution of the dye of Example X. The fastness of the dyeing to soaping is once again much greater than that of the colorant from which the new dyestuff is prepared.

Example XII 2-nitroquinizarin is condensed with epibromohydrin to form the bis-bromohydrin, according to the procedure in Example I.

A mixture of 11.2 g. (0.020 mole) of the bis-bromohydrin, 15.2 g. (0.20 mole) of thiourea, and 6 ml. of water is stirred at 95° C. until a portion is water-soluble. After cooling the reaction mixture and adding it to 200 ml. of acetone, the precipitated product is washed thoroughly with acetone and dried at 50° C. under vacuum. There is obtained 13.0 g. (92% yield) of yellow-brown-colored water-soluble dye.

Example XIII

The procedure of Example II is followed using a 1% solution of the dye of Example XII. The fastness of the dyeing to soaping is once again much greater than that of the colorant from which the new dyestuff is made.

Example XIV

The procedure of Example XII is repeated using 1,4'-bis(3 - bromo - 2 - hydroxypropoxy) - 4 - anilinoanthraquinone as a starting material. There is obtained in good yield a violet dye.

Example XV

The procedure of Example XII is repeated using a 2-bromo - 1,4 - bis(3 - bromo - 2 - hydroxypropoxy)anthraquinone as a starting material. There is obtained in good yield a weak yellow-orange dye.

Example XVI

The procedure of Example XII is repeated using 1,4,5,8-tetrakis - (3 - bromo - 2 - hydroxypropoxy)anthraquinone as a starting material. There is obtained in good yield a red-brown dye.

Example XVII

The procedure of Example XII is repeated using 1,5-bis(3 - bromo - 2 - hydroxypropoxy)anthraquinone as a starting material. There is obtained in good yield a weak yellow-brown dye.

Example XVIII

The procedure of Example XII is repeated using 1,4-bis-(3 - bromo - 2 - hydroxypropoxyethylamino) - 5,8 - bis-(3 - bromo - 2 - hydroxypropoxy)anthraquinone as a starting material. There is obtained in good yield a blue dye.

Example XIX

Copper tetra (4)-(p-hydroxyphenoxy)phthalocyanine is condensed with epibromohydrin according to the procedure in Example I to form the tetrabromohydrin in good yield. When the product so formed is reacted with an excess of N,N,N',N'-tetramethylthiourea, an excellent yield of water-soluble blue dye is obtained.

Example XX

The procedure of Example II is followed using a 1% solution of the dye of Example XIX. The fastness of the dyeing to soaping is once again much greater than that of the colorant from which the dyestuff is prepared.

Example XXI 5-(2,4-dinitrophenylamino)-2-naphthol is reacted with epibromohydrin according to the procedure in Example I.

A mixture of 18.5 g. (0.040 mole) of the bromohydrin so formed, 47.2 g. (0.40 mole) of N,N,N'-trimethylthiourea, and 40 ml. of water is stirred at 95° C. until a sample is water-soluble. After cooling and adding the reaction mixture to 500 ml. of acetone, the precipitated product is triturated well with acetone, washed with fresh portions of the same solvent and dried at 50° C. under vacuum. There is obtained 17.8 g. (77%) of orange dye.

Example XXII

The procedure of Example II is followed using a 1% solution of the dye of Example XXI. The fastness of the dyeing to soaping is once again much greater than that of the colorant from which the dyestuff is prepared.

Example XXIII

At 25° C., cotton yarn is immersed in a bath containing 2% (on the weight of the goods) of the dye prepared according to Example I. Sodium chloride (150% on the weight of the goods) is added and the bath is raised to 60° C. during one hour. During this time, a total of 24% (on the weight of the goods) of trisodium phosphate is added gradually. The dyed yarn is rinsed, soaped, and dried. It exhibits very good wet fastness.

Example XXIV

Wool yarn is dyed for one hour at 88° C. in a 1:30 dyebath containing 10% of sodium carbonate (on the weight of the goods) and 2% of the dye prepared in Example I. After rinsing, the dyed material exhibits very good wet fastness.

Alternatively, the yarn is immersed for one-half hour at 88° C. in a 2% solution of the dye prepared in Example I. There is then added 3% (on the weight of the goods) of 85% formic acid and the dyeing is continued for another one-half hour. After rinsing, the goods are treated for one-half hour at 88° C. with a solution containing one gram of soap and four grams of soda ash per liter. The goods are rinsed and dried. The dyed yarn possesses very good wet fastness.

*Example XXV*

Nylon yarn is dyed according to the procedures of Example XXIV. Once again, surprisingly good wet fastness is exhibited by the dyed goods.

We claim:
1. A dyestuff of the formula:

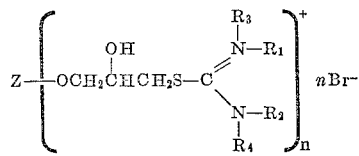

wherein Z is a water-insoluble dyestuff moiety selected from the group consisting of azo, anthraquinone, phthalocyanine and nitro; $R_1$ and $R_2$, as individual substituents, are members selected from the group consisting of hydrogen and lower alkyl and, taken collectively, represent an alkylene bridge having from 2 to 3 carbon atoms, said bridge connecting the N atoms to which $R_1$ and $R_2$ are attached; $R_3$ and $R_4$ are members selected from the group consisting of hydrogen and lower alkyl; and $n$ is an integer having a value of from 1 to 4.

2. A dyestuff of claim 1, wherein Z is azo, $R_1$, $R_2$, $R_3$ and $R_4$ are hydrogen and $n$ is one.
3. A dyestuff of claim 1, wherein Z is anthraquinone, $R_1$, $R_2$, $R_3$ and $R_4$ are hydrogen and $n$ is two.
4. A dyestuff of claim 1, wherein Z is phthalocyanine, $R_1$, $R_2$, $R_3$ and $R_4$ are hydrogen and $n$ is four.
5. A dyestuff of claim 1, wherein Z is nitro, $R_1$, $R_2$, $R_3$ and $R_4$ are hydrogen and $n$ is one.

References Cited in the file of this patent
UNITED STATES PATENTS

| | | |
|---|---|---|
| 2,645,641 | Renfrew et al. | July 14, 1953 |
| 2,664,427 | Randall et al. | Dec. 29, 1953 |
| 2,829,129 | Semmens et al. | Apr. 1, 1958 |

UNITED STATES PATENT OFFICE
CERTIFICATE OF CORRECTION

Patent No. 3,155,645　　　　　　　　　　　　　　　November 3, 1964

David Taber et al.

It is hereby certified that error appears in the above numbered patent requiring correction and that the said Letters Patent should read as corrected below.

Column 4, line 16, for "1-amino-2-ethylmercapto-4-hy-" read -- 1-amino-2-benzylmercapto-4-hy- --; column 6, line 51, for "dying" read -- drying --.

Signed and sealed this 22nd day of February 1966.

(SEAL)
Attest:

ERNEST W. SWIDER　　　　　　　　　　　　　　EDWARD J. BRENNER
Attesting Officer　　　　　　　　　　　　　　　　Commissioner of Patents